Nov. 22, 1932. J. SCHMIEDEL 1,888,808
MACHINE FOR PRODUCING TWO-PART BOXES
Filed May 12, 1930 10 Sheets-Sheet 1

Fig.1

Nov. 22, 1932.  J. SCHMIEDEL  1,888,808
MACHINE FOR PRODUCING TWO-PART BOXES
Filed May 12, 1930  10 Sheets-Sheet 2

Fig.1ª.

Inventor
Johannes Schmiedel
By
Max F. Ordmann
Atty

Nov. 22, 1932.    J. SCHMIEDEL    1,888,808
MACHINE FOR PRODUCING TWO-PART BOXES
Filed May 12, 1930    10 Sheets-Sheet 3

Fig.2

Nov. 22, 1932.  J. SCHMIEDEL  1,888,808

MACHINE FOR PRODUCING TWO-PART BOXES

Filed May 12, 1930  10 Sheets-Sheet 4

Nov. 22, 1932.  J. SCHMIEDEL  1,888,808
MACHINE FOR PRODUCING TWO-PART BOXES
Filed May 12, 1930   10 Sheets-Sheet 6

Nov. 22, 1932.    J. SCHMIEDEL    1,888,808
MACHINE FOR PRODUCING TWO-PART BOXES
Filed May 12, 1930    10 Sheets-Sheet 7

Nov. 22, 1932.   J. SCHMIEDEL   1,888,808
MACHINE FOR PRODUCING TWO-PART BOXES
Filed May 12, 1930   10 Sheets-Sheet 8

Inventor
Johannes Schmiedel
By
Mark H. Ordman
Atty

Nov. 22, 1932.   J. SCHMIEDEL   1,888,808
MACHINE FOR PRODUCING TWO-PART BOXES
Filed May 12, 1930   10 Sheets-Sheet 9

Nov. 22, 1932.　　　J. SCHMIEDEL　　　1,888,808
MACHINE FOR PRODUCING TWO-PART BOXES
Filed May 12, 1930　　10 Sheets-Sheet 10

Patented Nov. 22, 1932

1,888,808

UNITED STATES PATENT OFFICE

JOHANNES SCHMIEDEL, OF DRESDEN, GERMANY, ASSIGNOR TO THE FIRM UNIVERSELLE CIGARETTENMASCHINEN-FABRIK J. C. MULLER & CO., OF DRESDEN, GERMANY

MACHINE FOR PRODUCING TWO-PART BOXES

Application filed May 12, 1930, Serial No. 451,652, and in Germany January 11, 1930.

In the manufacture of boxes which consists of two parts, (a lid and a body portion) connected by a binding strip which is then cut along three sides in order to form a hinge for the lid, it is usual to form the box lid in one machine and the body portion in a separate machine. Then the two parts are transferred to apparatus which unites them and they are then bound and cut.

Although it has already been proposed to combine the apparatus for joining the box parts in one machine with the apparatus for binding and cutting the work, it has not hitherto been possible to combine the apparatus for producing the two box parts with the apparatus for joining the two parts into one machine. Apart from the difficulty that the two apparatus for producing the box parts operate in different working cycles and therefore their combination in one machine is not practicable, there is another objection that the delivery of the finished box parts to the place where they are joined involved the introduction of complicated operating means which rendered difficult the co-operation of all the parts or gave rise to stoppage in operation.

By the present invention the difficulties are overcome since the apparatus for producing the box lid, the apparatus for producing the body portion of the box and the apparatus for combining the two box parts being combined together in one working machine, several devices operating to produce shaped box lids on a pile beneath which is arranged the uniting station at which the rapidly moving apparatus for producing the body portions of the box delivers its work, whereupon the completed boxes are bound by known means and cut in the same machine.

A particular arrangement of the means for forming the body portions of the boxes and for feeding the same to the uniting station is provided while a particular arrangement of the pile for the box lids in conjunction with the means for uniting the box lids with the body portions brought thereto is provided.

In the embodiment illustrated the box lids are produced by a shaping process in known manner while the body portions are formed from previously grooved, creased, ribbed or scored blanks with the aid of a forming block.

Fig. 19 is a section along line 19—19 of Fig. 1;
Fig. 22 shows a section along line 22—22 of Fig. 1a;
Fig. 23 shows the plan view of the belting of Fig. 22.

Figure 7:
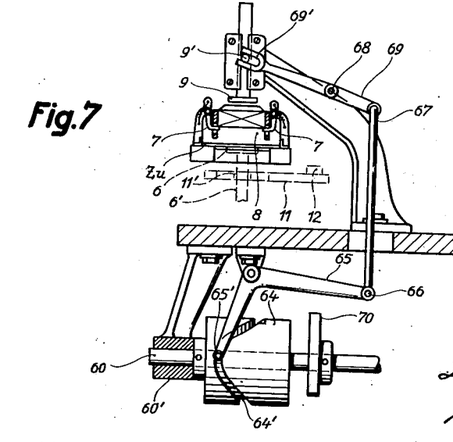
Fig. 7 is a section along line 7—7 of Fig. 1.

The scored and creased blank Zu of the body portion of the box is taken by means of a known conveyor 2 from a vertical pile 1 and fed in front of a shaping channel 3 to a stop 4. Adjacent the shaping channel are provided two square blocks 5 on which the box blank rests by means of the two side flaps Zu'. The plunger 6 adjacent the shaping channel 3 is at this time in the position shown in full lines in Fig. 2. Now the forming block F which is prevented from falling by the two resilient fingers 7 (see particularly Fig. 7 which shows a part of the section on the line 7—7 of Fig. 2 to an enlarged scale) is placed by way of the vertical channel 8 on the blank Zu, the plunger 9 acting from above on the forming block F. On further forward movement of the plunger 9 pushing back the plunger 6 the two flaps Zu' are bent at right angles by the small blocks 5. Then the blank contacts with the channel edge 3' and the two flaps Zu² are bent upwards with the upturned flaps Zu'. Then the blank Zu contacts with the edges 3² lying somewhat further back and the two blank portions Zu³ still projecting are bent upwards at right angles. Then the two gummed portions Zu⁴, the gum on which is applied by the usual gumming apparatus 10 to the blank Zu which is passing, are pressed against the flaps Zu'. On further downward movement of the plungers 6 and 9 the shaped body portion of the blank is now fed through the shaping channel 3 into a frame 11 which is in the position shown dotted in Fig. 2. After the plunger 6 has moved back into the position shown in Fig. 2 the plunger 9 has again moved upwards on its return movement and the frame 11 which is secured to a support 12 is moved in the direction of the arrow shown in Fig. 1. For this purpose the support 12 is mounted in a guide 13 and moves in harmony with the plungers 6 and 9. The other end position of the frame 11 is indicated in full lines in Fig. 2.

In this end position adjacent the frame 11 is arranged a plunger 14 which pushes the work downwards in a feed track bounded by two walls 15. At the bottom is located a conveyor chain 16 on which the box carriers 16' are arranged, on which also the resilient holders 17 are provided which clamp between them the forming block provided with the box part. After the plunger 14 has moved upwards again into the position shown dotted in Fig. 2 the frame 11 is also fed back into the position shown in full lines in Fig. 1. In order to make room for the plunger already back in the position shown in full lines in Fig. 2 an opening 11' is provided in the frame 11.

Figure 1:
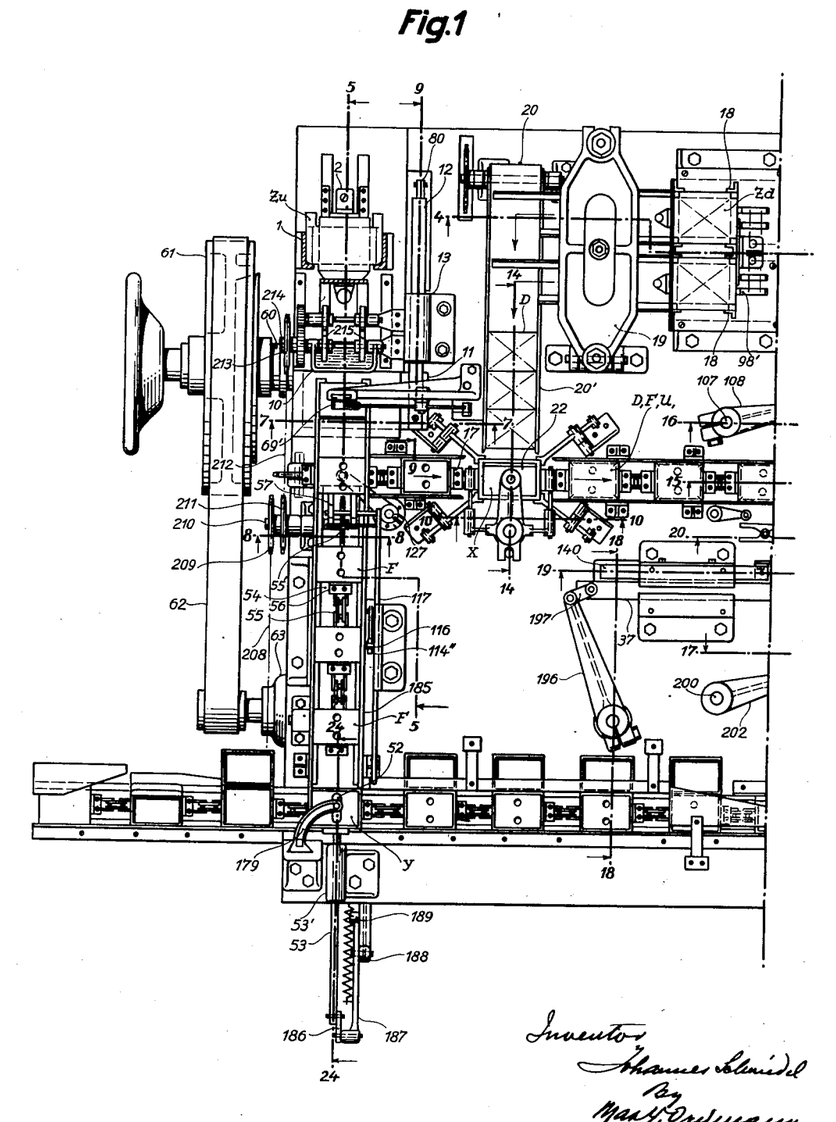
Fig. 1 shows a top plan view of the machine.
Figure 2:
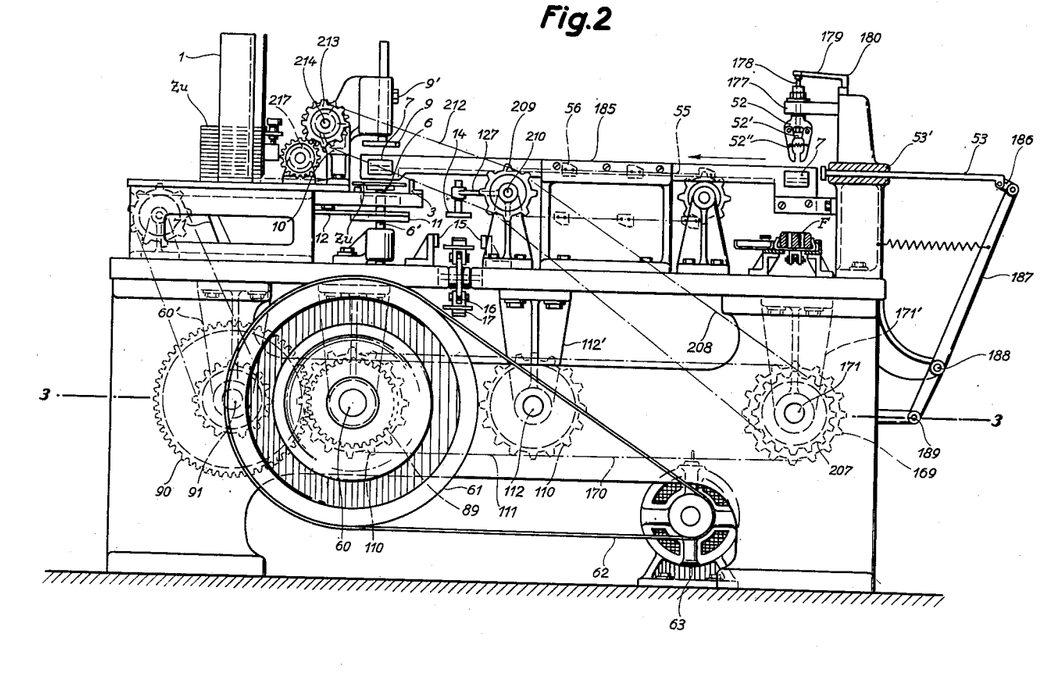
Fig. 2 is a side elevation seen from the left of Fig. 1.
Figure 4:
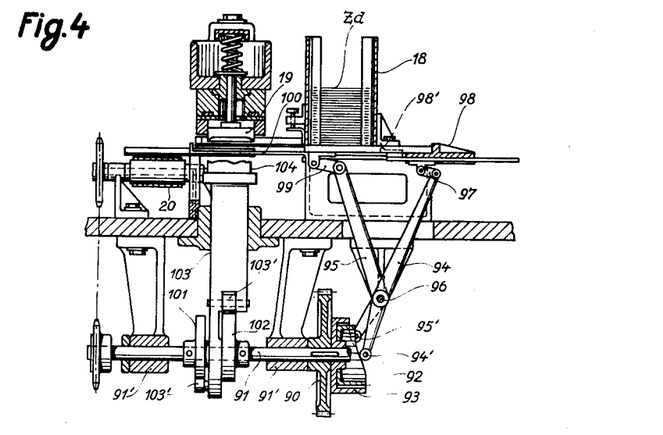
Fig. 4 is a section along line 4—4 of Fig. 1.
Figure 5:
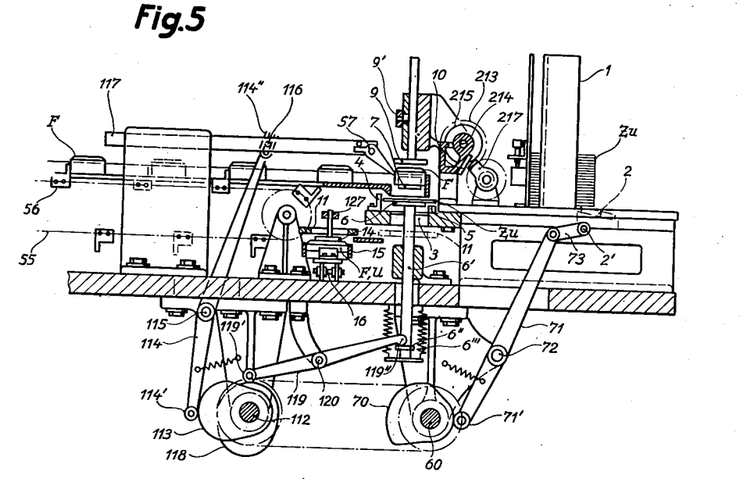
Fig. 5 is a section along line 5—5 of Fig. 1.

The work delivered to the conveyor chain in the manner described is moved in the direction of the arrow indicated in Fig. 1 to the position indicated by x at which the box lid is applied. The plain blanks Zd of the box lid stamped out at the corners and printed are fed from two adjacent piles 18 by known feeding means to the shaping and stamping dies 19 the apparatus being so operated that two articles are introduced to the presses at a time and simultaneneously pressed. From the stamping dies 19 the work is delivered to a horizontal channel 20 in which it is fed by means (not shown) to the point x. The appparatus indicated by x in Fig. 1 in which the lid is applied to the body portion of the box is shown in Figs. 4 and 5 in front elevation and in plan respectively. At this point the channel 20 is formed only by the two side rails 20' and a stop (not shown) standing in the direction of feed, downward movement being prevented by two supporting bars 21 suitably operated on which the two opposite neck portions of the lid D rest. On downward movement of the plunger 22 the rails 21 are retracted at the same time so that the lid D can now move downwards. The lid first contacts with four holders 23, each engaging a corner and secured to levers 24. These levers 24 are rotatable in bearings 25 and are moved downwards by operating rods 26 on forward movement of the plunger 22. The holders 23 engage with their angle members 23' fitting beneath the corners of the lid. By the downward movement of the holders 23 the special exact adjustment and positioning of the lid on the box body is ensured because the pivots on the levers 24 are so selected that the angle members 23' of the holders 23 slip past the corners of the body portion of the box and bend the neck portions of the lid slightly outwards. When the lid portion is applied to the body portion the supports are moved downwards and release the lid of the box. The holders remain in this lowermost position until the conveyor chain 16 has led the next box body provided with a forming block to the lid applying device. Then the holders 23 are again moved upwards into the position shown in Fig. 4 and the operation is repeated.

By means of the conveyor chain 16 the box bodies provided with the lid are fed to the channel 27 adjacent which is arranged the plunger 28. The work is pushed through the channel 27 by means of the plunger into a channel 29. Between the channels 27 and 29 is a binding strip B drawn from a spool 30 by means of a gripper 31 suitably operated in known manner. This binding strip is provided with adhesive in known manner by means of the adhesive applying device 32. A pin 33 extending at an inclination and resting resiliently on the strip prevents the strip from slipping until it is cut. This binding strip prepared in known manner is now secured to the front side of the work, a suitably operated plunger 34 ensuring firm and uniform pressure. On further movement into the channel 29 the end of the binding strip are given a U-form and placed around the box, rollers 35 being preferably provided at the two corners of the channel. After the plunger 34 has returned into the position shown in Fig. 1 with the work, a bending finger 36 operated in known manner moves forward and places the short end of the binding strip projecting beyond the front finally against the work. Then the plunger 37 moves forward, pushes the work into the channel 38 adjacent which is arranged a roller 39 which bends over the long end of the binding strip. On the walls of the channel 38 are preferably provided brushes 40 which ensure the pressure of the binding strip at all sides against the work.

Figure 6:
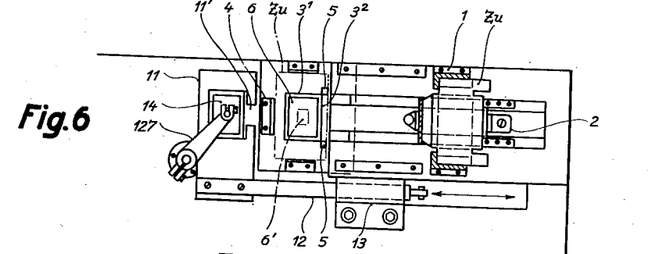
Fig. 6 is a detail seen in the direction of the arrow in Fig. 5.

The plunger 37 feeds the work forward to a channel 41 adjacent which is arranged a conveyor chain 42. The entraining members 43 of the conveyor chain 42 now feed the work in the direction indicated by the arrow in Fig. 1. Brushes 44 are also provided on both sides of the channel for the above-mentioned purpose. At the end of the channel 41 are arranged rotary cutters 45 which cut the box. From the conveyor chain 43 to the channel 46 the work is held by entraining members 47 which are mounted on a conveyor chain 48. At the commencement of the channel 46 is provided a further rotary cutter 49 which cuts the third front face of the box. After the lid has been lifted by a suitably operated wedge 50 the final opening of the box is effected by the guide cam 51 of known construction. From the open box the forming block is removed at the point indicated by $y$ in Fig. 1 by means of grippers 52 operated in known manner (see particularly Fig. 6 which shows part of the device seen from the side) and are raised into the path of a plunger 53. This plunger feeds the forming block into a feed channel 54 adjacent which is arranged a conveyor chain 55. On the conveyor chain 55 are mounted entraining members 56 which feed the forming block to the position shown dotted in Fig. 2. From this point the forming block is brought by means of a hinged lug 57 to the channel 8 and from here the forming block as already described is fed by means of the plunger 9 into its working position.

After the forming block has been removed from the opened box the entraining members 47 on the conveyor chain 48 moves the open boxes past suitable guide cams 58 and 59 which reclose the said boxes.

The drive of the apparatus is obtained from the main shaft 60 which carries the pulley wheel 61 and which is journaled at 60′ to the machine frame. A belt 62 serves to drive said pulley from a motor 63. Mounted on shaft 60″ is a cam cylinder 64 having a cam groove 64′ in which roller 65′ (Fig. 7) on one end of an angle lever 65 engages. The free end of lever 65 is pivotally joined at 66 to a link 67 which in turn pivotally engages one arm of a double armed lever 69 which latter is pivoted to the machine frame at 68. The free arm of lever 69 is forked at 69′ and engages a pin 9′ on pusher 9. The tracking of roller 65′ in cam groove 64′ thus effects reciprocal movement of the pusher 9.

A cam 70 is mounted on main shaft 60 and a roller 71′ on one end of a double armed lever 71 tracks said cam. Lever 71 is articulated at 72 to the machine frame. A link 73 connects the free arm of said lever at 2′ to the pusher 2 which feeds the body portions of the box from the pile 1.

Figure 9:
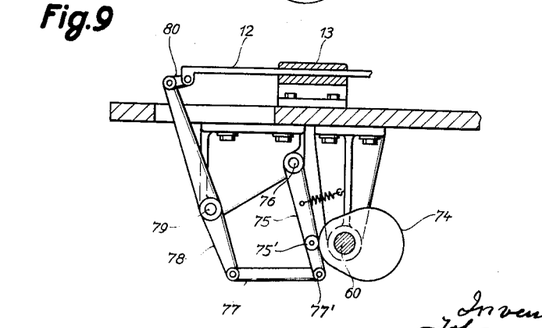
Fig. 9 is a section along line 9—9 of Fig. 1.

Another cam 74 is mounted on shaft 60 and a roller 75′ on a lever 75 (Fig. 9) tracks said cam. Lever 75 is articulated at one end 76 to the machine frame. The other end of said lever at 77′ is connected to a link 77 which is also connected to one arm of a double armed lever 78 which latter at 79 is articulated to the machine frame. A link 80 connects the free arm of lever 78 with support 12 to which latter the frame 11 is secured. Thus the reciprocal motion of said frame is effected.

Figure 14:
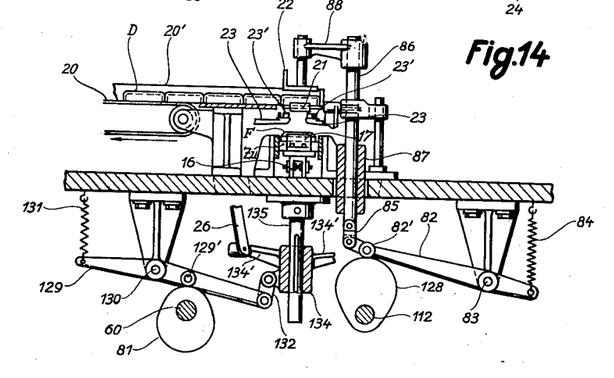
Fig. 14 is a section along line 14—14 of Fig. 1.

Another cam 81 (Figs. 3 and 14) is mounted on shaft 60 and a roller 82′ on a lever 82 tracks said cams. Lever 82 is articulated at 83 to the machine frame. A spring 84 maintains the rolling contact between said roller and said cam. A link 85 connects the free end of lever 82 with a plunger rod 86, slidably journalled at 87. Said plunger is connected through a coupler 88 with plunger 22 which is thus reciprocally movable through means of cam 81.

A spur wheel 89 (Figs. 3 and 4) is mounted on shaft 60 and meshes with a spur wheel 90 which latter is mounted on a shaft 91 suitably journaled at 91′ to the machine frame or the like. Mounted on said shaft 91 are two concentrically mounted cams 92 and 93. A roller 94′ mounted on a double armed lever 94 tracks the inner cam 92 and a roller 95′ mounted on a double armed lever 95 tracks the outer cam 93. Both levers 94 and 95 are articulated on a pin 96 to a fixed portion of the machine frame. The free end of lever 94 is connected through a link 97 with pusher 98. The latter has a nose 98′ which serves to engage the plain blanks $2^d$ and push them individually from the pile 18 to the stamping dies 19. Lever 95 through a link 99 is connected to pusher 100 which pushes the die formed blanks from die 19 to the horizontal channel 20. On shaft 91 there are additional cams 101 and 102 on which cam rollers 103′ of pusher 103 track and which work together. The pusher 103 carries the lower portion 104 of the die 19.

Mounted on the main shaft 60 is a cam drum 105 (Figs. 1, 3 and 16) having a cam groove 105′ in which a roller 106′ tracks.

Figure 3:
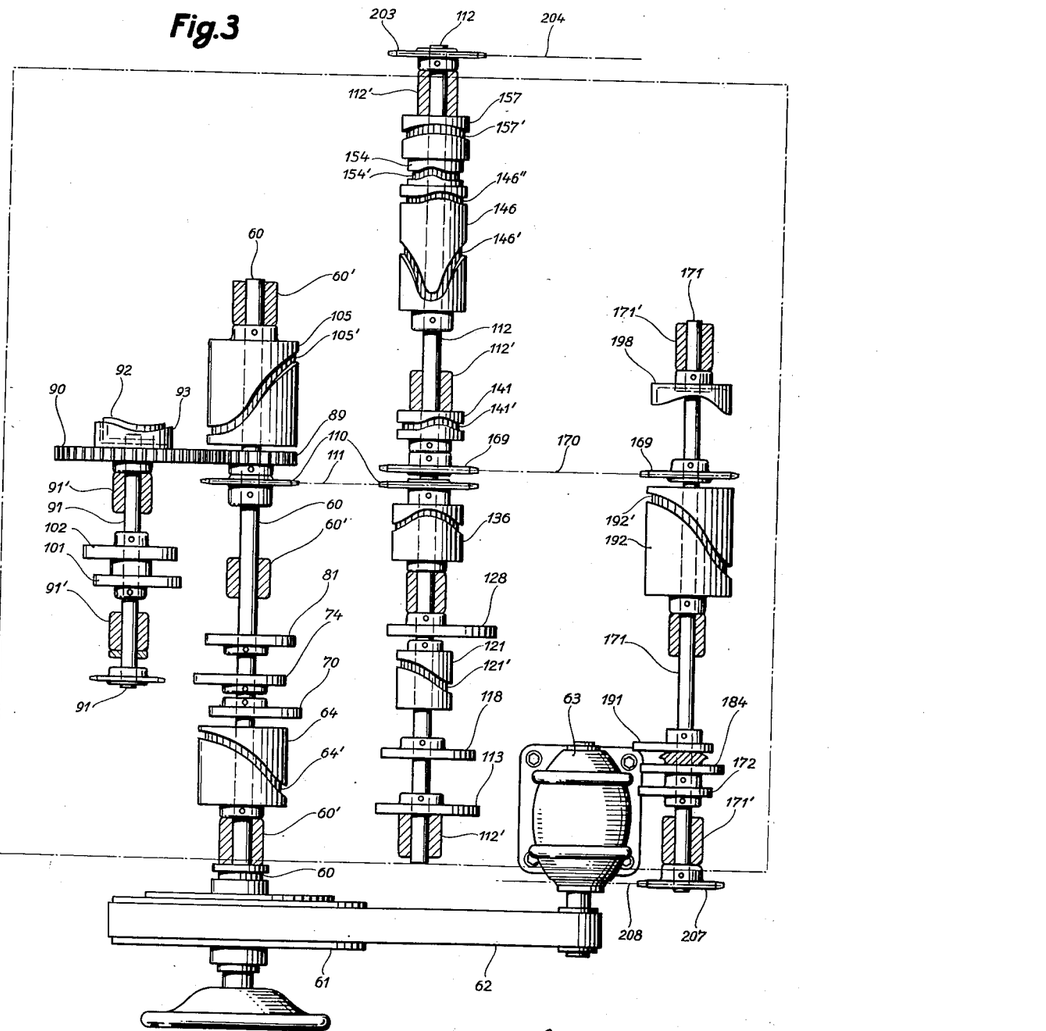
Fig. 3 shows a section along line 3—3 of Fig. 2 to illustrate the driving means.
Figure 16:
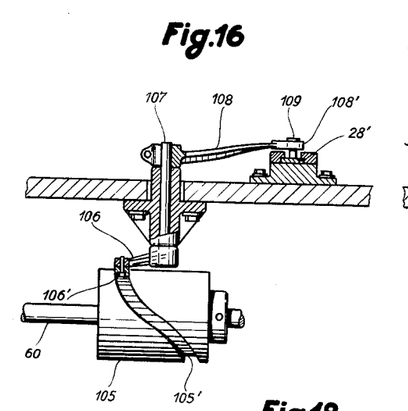
Fig. 16 is a section along line 16—16 of Fig. 1.

The latter is mounted on a lever 106 which is fixedly mounted to the rotatable spindle 107. A second lever 108 is fixedly attached to said spindle and forked end 108' thereof engages a roller 109 on plunger stem 28' of plunger 28. Thus the latter is reciprocally movable to push the work through channel 27 into channel 29.

A sprocket wheel 110 mounted on main shaft 60 is connected to a similar sprocket wheel 110' on a shaft 112 which latter is suitably journalled at 112' to a stationary part of the machine frame. On shaft 112 there is mounted a cam 113 (Figs. 3 and 5) on which a roller 114' tracks. The latter is borne on one arm of a double armed lever 114 which latter is articulated at 115 to the machine frame. The free arm of said lever is forked at 114'' and engages a roller 116 on a slidably journalled plunger 117 to which hinged lug 57 which feeds the forming blocks F in front of the plunger 9, is mounted.

A further cam 118 (Figs. 3 and 5) is mounted on shaft 112 and a roller 119' mounted on a double armed lever 119 tracks the same. The lever is articulated at 120 to a stationary part of the machine frame. The free arm of said lever engages with its end 119'' a shoulder 6'' on the stem 6' of plunger 6. Spring 6''' continuously urges said stem toward the left thus maintaining constant engagement between roller 119' and cam 118. Thus reciprocal movement of plunger 6 is effected.

Figure 8:
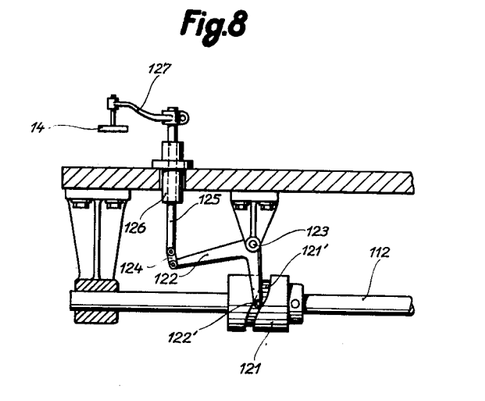
Fig. 8 is a section along line 8—8 of Fig. 1.

Additionally mounted on shaft 112 is a cam drum 121 (Figs. 3 and 8) having a cam groove 121' in which a roller 122' tracks. The latter is mounted to one arm of a double armed lever 122 which at 123 is articulated to the machine frame. A link 124 connects the free arm with a plunger stem 125 slidably journaled to the machine at 126. A lever 127 is rigidly connected to said plunger stem 125 and bears plunger 14. Thus the latter is reciprocally moved.

Figures 10, 11, 12, 13:
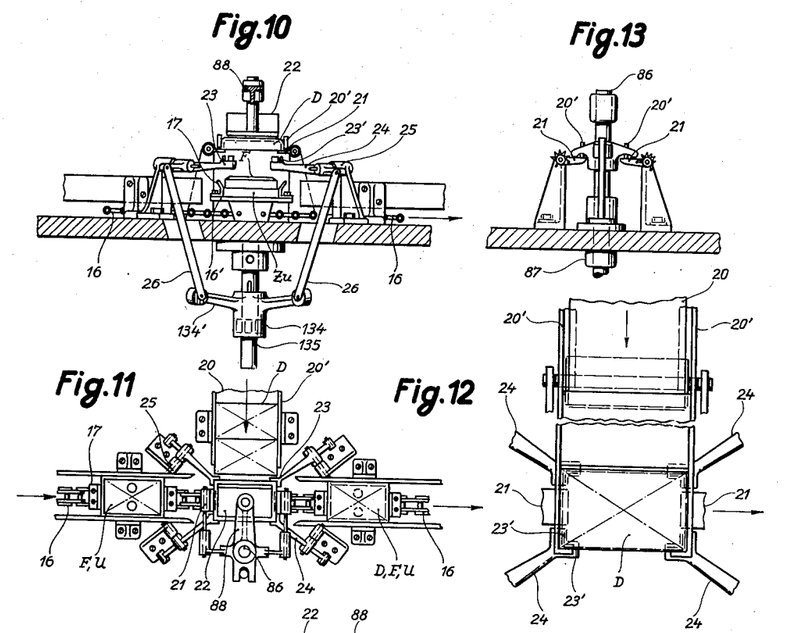
Fig. 10 is a section along line 10—10 of Fig. 1.
Fig. 11 is a top plan view of the apparatus shown in Fig. 10.
Fig. 12 is an enlargement of a detail seen in Fig. 11.
Fig. 13 is a side elevation seen in the direction of the arrow of Fig. 11.

A further cam 81 (Figs. 3 and 14) is mounted on shaft 60 and a roller 129' borne on a lever 129 tracks the same. The lever intermediate its end at 130 is articulated to the machine frame. A spring 131' serves to maintain contact between roller 129' and cam 60. A link 132 is connected to the lever and to a slider 134 slidably mounted on a stem 135. Slider 134 has projecting therefrom four arms 134' in star shaped fashion to the end of each of which an operating rod 26 is connected and which as shown in Figs. 10 and 11 are connected to the levers 24 of the holders 23.

A cam drum 136 having a cam groove 136' (Figs. 1, 3 and 19) is mounted on shaft 112 and a roller 137' tracks the same. Said roller is mounted to one arm of a double armed lever 137 which is articulated at 138 to the machine frame. The free end of lever 137 is connected by link 138 to pusher 140 which carries bending finger 36. Thus the latter is reciprocated.

A cam drum 141 having a cam groove 141' (Figs. 1, 3, 20 and 21) in which roller 142' tracks, is mounted on shaft 112. The roller 142' is mounted on a lever 142 which latter is mounted on a spindle 143 rotatably journalled at 144 in the machine frame. At its upper end spindle 143 has mounted lever 145 whose free end has a roller 145'. This latter engages the grippers 31 and thus the latter may be opened and closed.

Figure 21:
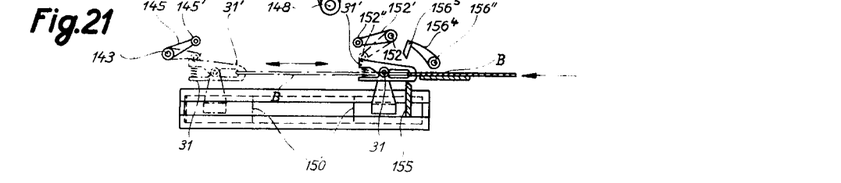
Fig. 21 shows a plan view of the apparatus shown in Fig. 20.

A cam drum 146 having cam grooves 136' and 146'' is mounted on shaft 112. In groove 146' a roller 147' attached to a lever 147 tracks. The latter is articulated to the machine frame at 148 and is connected at its free end by a link 149 to pusher 150 which carries the gripper 31. In cam groove 146'', a roller 151' tracks, and the latter is connected to a lever 151. The latter is mounted on a spindle 152 which is rotatably journalled at 153 to the machine frame. At its upper end a lever 152' is attached to said spindle. Lever 152' has a roller 152'' at its free end which is adapted to engage end 31' of the gripper 31 to open the latter against the action of spring 31'' which tends to close the latter. Thus at each end of the reciprocatory stroke of grippers 31 on pusher 150, the jaws thereof may be opened by engagement with roller 145' or at the other end by roller 152'' (Fig. 21).

A cam 154 having a cam groove 154' (Figs. 1, 3, 20 and 21) is mounted on shaft 112 and a roller 156' tracks the same. The latter is mounted to a lever 156 which is fixed to a spindle 156'' which latter is rotatably journaled at 156'''. At its upper end spindle 156'' has attached carrier 156⁴ for a movable knife 156⁵ to sever the binding strip B.

Figure 15:
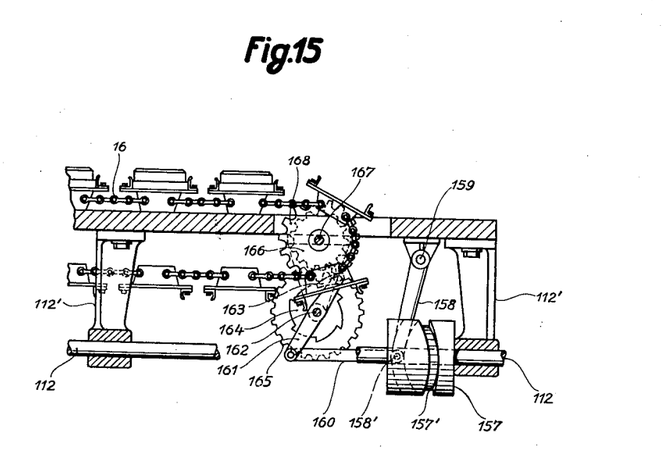
Fig. 15 is a section along line 15—15 of Fig. 1.

A cam drum 157 having a cam groove 157' (Figs. 1, 3 and 15) is mounted on shaft 112 and a cam roller 158' tracks said groove. Said roller is mounted on a lever 158 which at 159 is articulated to the machine frame. The free end of said lever is connected by a link 160 to a pawl carrier 161 which is rotatably mounted on a shaft 162. A pawl 163 on said carrier engages a ratchet wheel 164 which is fixedly mounted on shaft 162, which is suitably journalled to the machine frame. Also mounted on said shaft 162 is a spur wheel 165 which meshes with a spur wheel 166. The latter is borne on a shaft 167 suitably journalled in the machine frame and carries a sprocket wheel 168 over which the conveyor chain 16 passes. Thus the said conveyor chain is driven.

A sprocket wheel 169 on shaft 112 is connected to a sprocket wheel 169' on a shaft 171 by a chain 170 and thus serves to drive said shaft 171 (Fig. 3).

Figures 24, 25:
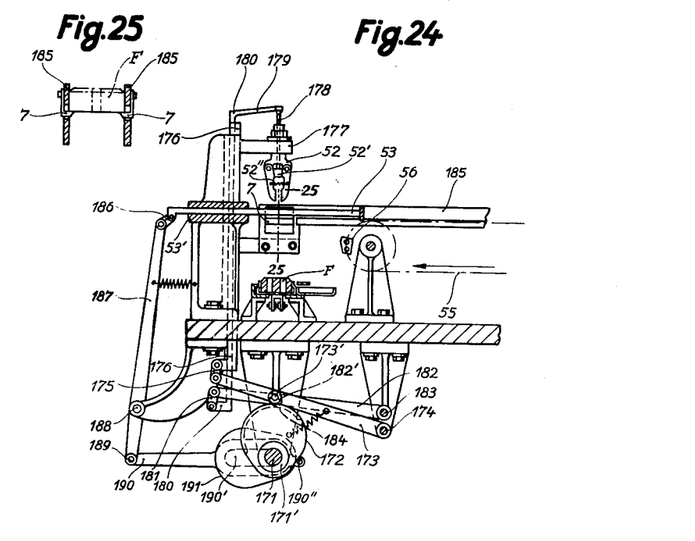
Fig. 24 shows a section along line 24—24 of Fig. 1.
Fig. 25 shows a section along line 25—25 of Fig. 24.

A cam 172 on which a cam roller 173' tracks (Figs. 3 and 24) is mounted on shaft 171. Roller 173' is borne on a lever 173 which at 174 is articulated to the machine frame. The free end of said lever is connected by a link 175 with a pusher 176 slidably borne in the machine frame and which is attached to carrier 177 for the grippers 52. The spreader 52' which serves to separate the jaws of said gripper against the action of spring 52'' is manipulated through a stem 178 to which it is attached and which is slidably movable through carrier 177. An arm 179 connected said stem to a pusher 180 which at its lower end is connected through a link 180 to a lever 182. The latter is articulated at 183 to the machine frame and has a roller 182' which tracks a cam 184 mounted on shaft 171.

By means of the gripper 52, the forming block F is removed from the shaped boxes and raised in channel walls 185 past the spring actuated noses 7 which are pushed out of the way as said block is raised and then automatically repositioned under the freed block to prevent said block from falling when the gripper 52 is released. A pusher 53 is then used to push the freed block onto the conveyor chain 55. Said pusher is slidably borne at 53' in the machine frame and its end is connected by a link 186 to a lever 187 which latter is articulated at 188 to said frame at 189. Lever 187 is jointed to the connecting link 190 which has a slot 190' in which the shaft 171 freely rotates and which is provided with a roller 190'' which tracks a cam 191 mounted on shaft 171. Thus reciprocation of pusher 53 is effected.

Figure 18:
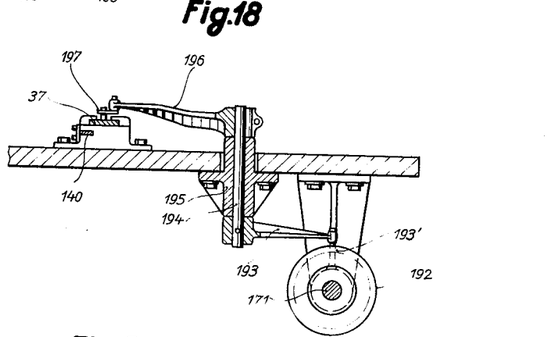
Fig. 18 is a section along line 18—18 of Fig. 1.

A cam drum 192 having a cam groove 192' in which a roller 193' tracks (Figs. 1, 3 and 18) is mounted on shaft 171. Roller 193' is borne on a lever 193 which latter is fixed to a spindle 194 rotatably journaled at 195 to the machine frame. A lever 196 is fixed to the upper end of spindle 194 and through link 197 is connected to the plunger 37. Thus the latter is reciprocated.

Figure 17:
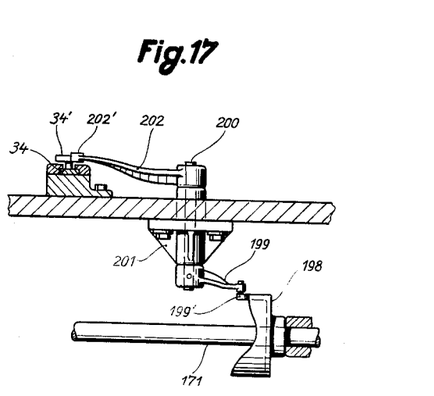
Fig. 17 is a section along line 17—17 of Fig. 1.

A cam 198 on which a cam roller 199' tracks is mounted on shaft 171 (Figs. 1, 3 and 17). Roller 199' is borne on a lever 199 which latter is attached to a spindle 200 rotatably journalled at 201 in the machine frame. An arm 202 is mounted on the upper end of spindle 200 and the free end 202' of said arm engages a projection 34' mounted on plunger 34 which latter is continually urged upwardly by springs 34'' and thereby maintains cam roller 199' in engagement with cam 198. Thus plunger 34 is reciprocally moved.

The drive of the sprocket wheel 42' over which conveyor chain 42 passes is effected through a sprocket wheel 203 (Fig. 1) mounted on shaft 112. Said wheel 203 is connected by a chain 204 with sprocket wheel 205 which is mounted on a shaft 206 suitably journalled in the machine frame. Sprocket wheel 42' is also fixed to said shaft 206.

Mounted on shaft 171 (Figs. 1, 2 and 3) is the sprocket wheel 207 which by means of sprocket chain 208 drives a sprocket wheel 209 which latter is mounted on a shaft 210 suitably journalled to the machine frame. On said shaft is mounted the driving sprocket wheel 55' for the conveyor chain 55. Another sprocket wheel 211 is mounted on said shaft and by means of a sprocket chain 212 drives a sprocket wheel 213 which is mounted to a suitably journalled shaft 214 on which the gumming rollers 215, which dip into the gum holders 216, are mounted. Gumming rollers 217 are mounted in rolling contact with roller 215 and serve to apply the gum to the proper places on the individual banks Zu.

Figures 1A, 26, 27, 28, 29, 30:
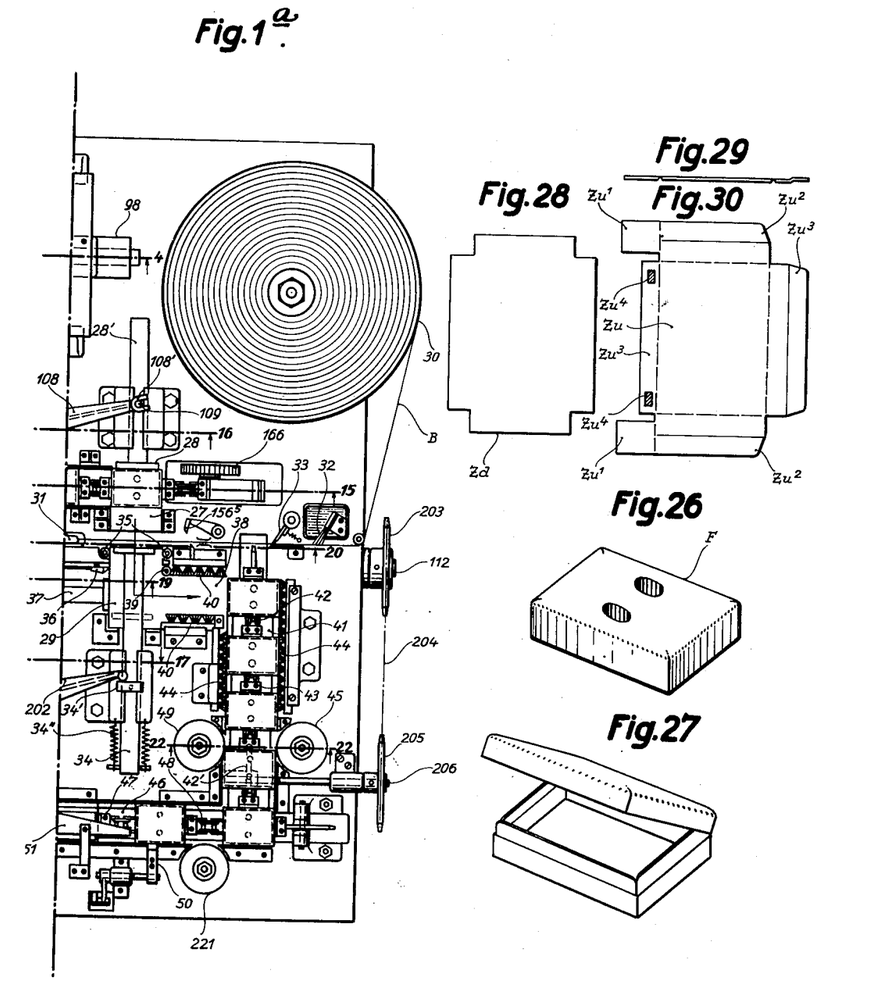
Fig. 1a is a continuation of Fig. 1.
Figs. 26–30 show the forming block, the finished box and the blanks used in the machine.
Figures 19, 22, 23:
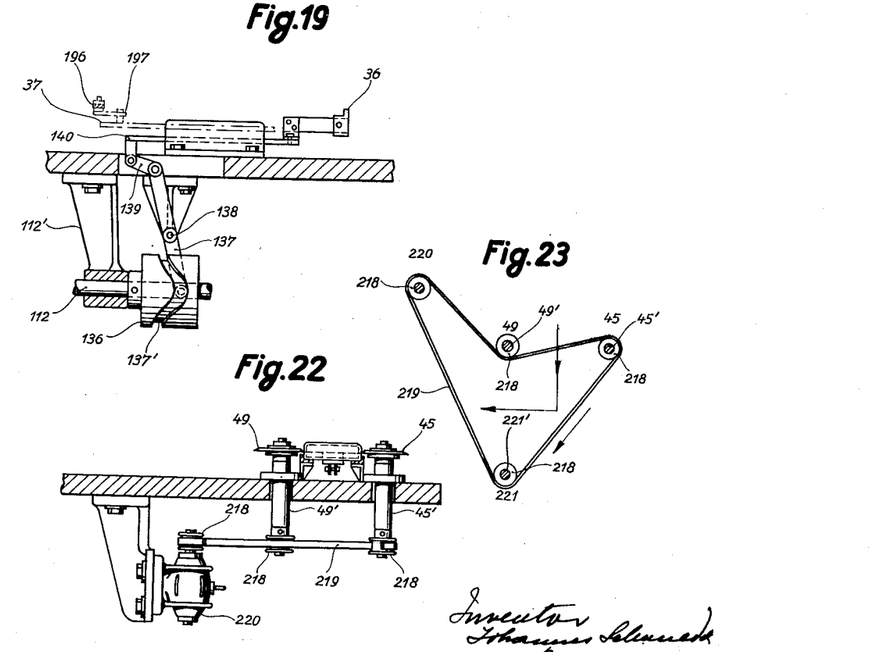
Figure 20:
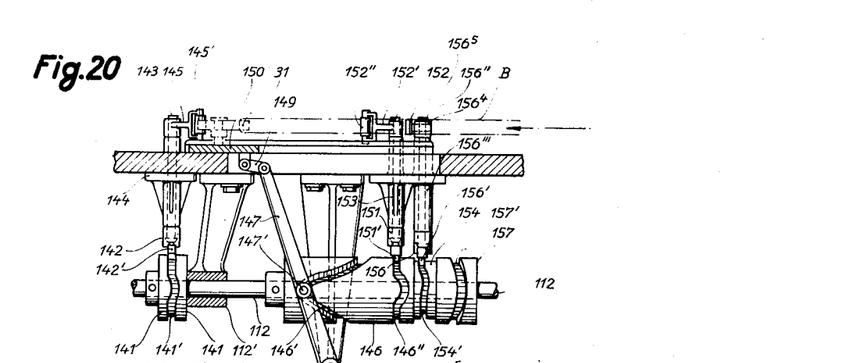
Fig. 20 is a section along line 20—20 of Fig. 1.

The rotary cutters 45, 49, and 221 which serve to cut the box on the required sides thereof are respectively mounted on suitably journalled shafts 45', 49', and 221' which latter at their respective ends have (Figs. 1a and 22) pulleys 218 with which a belt 219 engages (as shown in Figs. 22 and 23 and which is driven from a pulley on a small electric motor 220 suitably mounted from the machine frame.

The pusher 150 (Figs. 20 and 21) on which the gripper is mounted, is reciprocable as described. At the right end point of its movement, the movable jaw 31' engages the roller 152'' of lever 152'. At this instant the lever 152' is in the position shown in Fig. 21 so that the gripper 31 has its jaws open for reception of the edging strip B. When the end of the latter is inserted in the open jaws, the cam 146'' moves arm 152' to the dotted position of Fig. 1, resulting in closing of the jaws of gripper 31 and gripping of said strip B. Then by means of cam 146' pusher 150 is moved to the left and pulls with it said strip B and it is layed over the plunger 34. When plunger 28 is moved downwardly and presses strip B on plunger 34, the lever 142 is so swung by cam 141' that the roller 145 on the end of said lever engages the movable jaw 31' of gripper 31 and opens it releasing B as shown in Fig. 21. As plunger 28 moves downwardly, the rollers 35 bend the strip B about the box sides and when said plunger reaches its lowermost position then the cam 154 causes the knife 156$^s$ to move downwardly to cut off the strip B. By means of finger 36 and the feeding of the box into canal 29, the still upstanding ends of the strip B are bent over onto the box sides. As soon as plunger 28 again has moved upwardly, the grippers 31 are again moved to the right and the sequence of events recited repeat themselves.

I claim,

1. A machine for producing two-part boxes comprising in combination means for producing a plurality of box lids at a time and delivering them to a pile, means for producing the body portions of boxes, said means including a shaping channel a forming block and a frame into which the body portion of each box is pressed with the forming block, a uniting station in which box lids and box bodies are joined, thereby enclosing said forming block disposed beneath the means for producing the box lids, a moving box carrier for feeding the body portions of boxes to the uniting station and to binding and cutting stations and means for removing the forming block from the completely formed box.

2. A machine for producing two-part boxes from blanks having flaps which extend on the hinged side to the level of the neck of the box, comprising in combination means for producing a plurality of box lids at a time and delivering them to a pile, means for producing the body portions of boxes, said means including a shaping channel, said shaping channel formed with stops which serve to bend the flaps of the blank at right angles, a forming block and a frame into which the body portion of each box is pressed with the forming block, a uniting station in which box lids and box bodies are joined, thereby enclosing said forming block disposed beneath the means for producing the box lids, a moving box carrier for feeding the body portions of boxes to the uniting station and to binding and cutting stations and means for removing the forming blocks from the completely formed boxes.

3. A machine for producing two part hinged boxes from blanks having flaps which extend on the hinged side of the box to the level of the neck thereof, comprising in combination, means for producing body portions of the boxes, said means including a shaping channel before which said blanks may be positioned, said shaping channel having stops serving to bend said flaps at right angles, a forming block adapted to be pushed into said shaping channel and carry with it said blank whereby the latter is folded about said block to form the body portion of said box, a frame into which said body portion is pressed with said forming block, said frame being displaceable from the initial position, when filled, to a second position, entraining means at said second position onto which said body portion and said forming block are deposited, said entraining means adapted to carry said body portion and block to a uniting position, means for feeding box lids to said uniting position, means at said position to facilitate mounting of a box lid on a body portion for enclosing said forming block, means for binding said united body and lid portions by gumming a strip about the side edges of said united lid and body portions, means for cutting open said united lid and body portions along three side edges, the uncut edge serving as a hinge for the lid and body portion, means for lifting said lid from said body portion by folding along said hinge side, means for removing said forming block from said opened box, means for returning said forming block to initial position for further use and means for closing the opened box after said forming block has been removed therefrom.

In testimony whereof I affix my signature.
JOHANNES SCHMIEDEL.